United States Patent Office 3,793,330
Patented Feb. 19, 1974

3,793,330
3-HYDROXY-QUINOPHTHALONE DYESTUFFS
Dietmar Kalz, Cologne, Rütger Neeff, Leverkusen, and Gerhard Wolfrum, Opladen, Germany, assignors to Bayer Aktiengesellschaft, Leverkusen, Germany
No Drawing. Filed Nov. 16, 1970, Ser. No. 90,157
Claims priority, application Germany, Nov. 22, 1969, P 19 58 664.2
Int. Cl. C07d 33/56
U.S. Cl. 260—289 QP    4 Claims

ABSTRACT OF THE DISCLOSURE

3′ - hydroxy-quinophthalone dyestuffs which are free from sulphonic acid groups and correspond to the formula

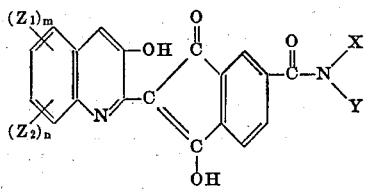

in which X stands for an optionally substituted cyclohexyl radical; Y denotes a $C_1$–$C_{17}$-, preferably a $C_2$–$C_6$-alkyl radical or an optionally substituted cyclohexyl radical; $Z_1$ stands for a halogen atom, a nitro, $C_1$–$C_4$-alkyl, $C_1$–$C_4$-alkoxy or an acylamino group; $m$ is a number from 0 to 3; $Z_2$ is a fused benzene ring; and $n$ is 1 or 0, and a process for their production. The dyestuffs are especially suitable for dyeing synthetic fibre materials.

---

The invention relates to quinophthalone dyestuffs; more particularly it concerns new 3′-hydroxy-quinophthalone dyestuffs which are free from sulphonic acid groups and correspond to the formula

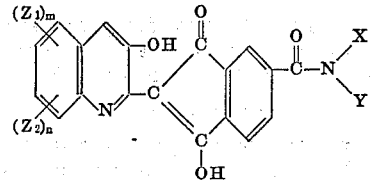

in which

X stands for an optionally substituted cyclohexyl radical;
Y denotes a $C_1$–$C_{17}$-, preferably a $C_2$–$C_6$- alkyl radical or an optionally substituted cyclohexyl radical;
$Z_1$ stands for a halogen atom, a nitro, $C_1$–$C_4$-alkyl, $C_1$–$C_4$-alkoxy or an acylamino group;
$m$ is a number from 0 to 3;
$Z_2$ is a fused benzene ring; and
$n$ is 1 or, preferably, 0, to a process for their production and to their use for dyeing synthetic fibre materials.

Examples of substituents for the cyclohexyl radicals are halogen atoms, especially the chlorine atom, lower alkyl radicals, such as the methyl, ethyl, isopropyl, sec.-butyl, tert.-butyl radicals; and lower alkoxy groups, especially the methoxy group.

Examples of $C_1$–$C_{17}$-alkyl radicals for Y are the methyl, ethyl, n-propyl, i-propyl, n-butyl, sec.-butyl, n-pentyl, n-hexyl, 2-ethyl-hexyl, 2,6-dimethyl-octyl, dodecyl, tetradecyl and hexadecyl radicals.

As acylamino groups should be mentioned for $Z_1$ the propionylamino, butyrylamino, benzoylamino and especially the acetylamino group.

The dyestuffs of the Formula I according to the invention are prepared by reacting 3′-hydroxy-quinophthalone-carboxylic acid halides of the formula

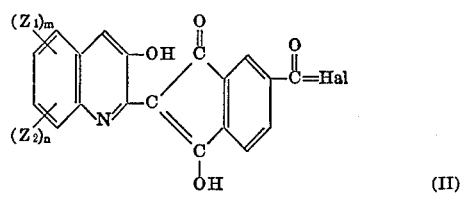

in which $Z_1$, $Z_2$, $m$ and $n$ have the same meaning as in Formula I, and Hal is a halogen atom, preferably a chlorine atom, with cyclohexylamines of the formula

in which X and Y have the same meaning as in Formula I.

The carboxylic acid halides of the Formula II required as starting materials can be prepared by condensing trimellitic acid anhydride with, for example, 2-methyl-3-hydroxyquinoline-4-carboxylic acid and subsequently converting the 3′-hydroxy - quinophthalone-carboxylic acid into its halide in the usual way by treatment with acid-halogenating agents, preferably with thionyl chloride.

Instead of 2 - methyl-3-hydroxy-quinoline-4-carboxylic acid, the following quinoline derivatives may also be used as starting materials for the preparation of 3′-hydroxy-quinophthalone-carboxylic acid halides of the general Formula II:

2-methyl-3-hydroxy-5-chloroquinoline-4-carboxylic acid
2-methyl-3-hydroxy-6-chloroquinoline-4-carboxylic acid
2-methyl-3-hydroxy-6-bromoquinoline-4-carboxylic acid
2-methyl-3-hydroxy-6-nitroquinoline-4-carboxylic acid
2-methyl-3-hydroxy-6-methoxyquinoline-4-carboxylic acid
2-methyl-3-hydroxy-6-methylquinoline-4-carboxylic acid
2-methyl-3-hydroxy-6-acetylaminoquinoline-4-carboxylic acid
2-methyl-3-hydroxy-6,7-dichloroquinoline-4-carboxylic acid
2-methyl-3-hydroxy-6,8-dichloroquinoline-4-carboxylic acid
2-methyl-3-hydroxy-6,8-dibromoquinoline-4-carboxylic acid
2-methyl-3-hydroxy-5,6,8-trichloroquinoline-4-carboxylic acid
2-methyl-3-hydroxy-6-chloro-8-methyl-quinoline-4-carboxylic acid
2-methyl-3-hydroxy-7-chloro-8-methyl-quinoline-4-carboxylic acid
2-methyl-3-hydroxy-6-chloro-5,8-dimethyl-quinoline-4-carboxylic acid
2-methyl-3-hydroxy-5-methyl-8-methoxy-quinoline-4-carboxylic acid
2-methyl-3-hydroxy-6-chloro-7-bromo-8-methyl-quinoline-4-carboxylic acid
2-methyl-3-hydroxy-5-methyl-6-chloro-8-methoxy-quinoline-4-carboxylic acid
2-methyl-3-hydroxy-5,6-benzoquinoline-4-carboxylic acid
2-methyl-3-hydroxy-6,7-benzoquinoline-4-carboxylic acid
2-methyl-3-hydroxy-7,8-benzoquinoline-4-carboxylic acid.

Examples of cyclohexylamines to be used according to the invention are:

dicyclohexylamine,
bis-(2-chloro-cyclohexyl)-amine,
bis-(3-chloro-cyclohexyl)-amine,
bis-(4-chloro-cyclohexyl)-amine,
bis-(2-methyl-cyclohexyl)-amine,
bis-(3-methyl-cyclohexyl)-amine,
bis-(4-methyl-cyclohexyl)-amine,
bis-(2-n-butyl-cyclohexyl)-amine,
bis-(4-n-butyl-cyclohexyl)-amine,
bis-(2-isobutyl-cyclohexyl)-amine,
bis-(3-isobutyl-cyclohexyl)-amine,
bis-(4-isobutylcyclohexyl)-amine,
bis-(2-methoxy-cyclohexyl)-amine,
bis-(3-methoxy-cyclohexyl)-amine,
bis-(4-methoxy-cyclohexyl)-amine,
methyl-cyclohexylamine,
ethyl-cyclohexylamine,
n-propyl-cyclohexylamine,
iso-propyl-cyclohexylamine,
n-butyl-cyclohexylamine,
sec.-butyl-cyclohexylamine,
8-cyclohexyl-amino-2,6-dimethyloctane,
dodecyl-cyclohexylamine,
stearyl-cyclohexylamine,
4-methylamino-1-chloro-cyclohexane,
3-methylamino-1-chlorocyclohexane,
2-methylamino-1-chloro-cyclohexane,
2-ethylamino-1-methyl-cyclohexane,
4-ethylamino-1-methyl-cyclohexane,
4-sec.-butylamino-1-ethyl-cyclohexane,
4-ethylamino-1-tert.-butyl-cyclohexane,
3-ethylamino-1-tert.-butyl-cyclohexane,
2-ethylamino-1-tert.-butyl-cyclohexane.

Condensation of the 3'-hydroxy-quinophthalone-carboxylic acid halides of the general Formula II with the cyclohexylamines of the Formula III to form the dyestuffs of the Formula I according to the invention is carried out at temperatures of 60 to 220° C., preferably at 120–180° C., in the presence of acid-binding agents, such as sodium acetate, pyridine, quinoline, triethylamine or dimethyl formamide, advantageously in inert organic solvents, for example, toluene, chlorobenzene, o-dichlorobenzene, trichlorobenzene, nitrobenzene, pyridine or quinoline.

The dyestuffs according to the invention are eminently suitable for the dyeing of synthetic fibre materials. When applied in the normal-temperature-dyeing process or in the high temperature-dyeing process as well as when dyeing is carried out according to the thermosol process, they yield yellow dyeings which are characterized by a high dyestuff yield, very good build up and excellent fastness properties, especially very good fastness to thermofixing, washing, rubbing and light.

The dyestuffs according to the invention which are very readily soluble in organic solvents, particularly in organic solvents which are essentially not water-miscible, are especially suitable for the continuous dyeing of synthetic fibre materials from organic solvents. The resultant dyeings are equivalent to dyeings obtained from aqueous baths with regard to dyestuff yield and build-up as well as with regard to their fastness properties.

For dyeing with the dyestuffs according to the invention from organic solvents, those organic solvents are advantageously used which are essentially not water-miscible and the boiling points of which lie between 40 and 150° C., for example, aromatic hydrocarbons, such as toluene and xylene; aliphatic halogenated hydrocarbons, especially chloroform, carbon tetrachloride, dichloroethane, trichloroethane, tetrachloroethane, dichloropropane, chlorobutane, dichlorobutane; and aliphatic fluorinated and fluoro-chlorinated hydrocarbons, such as perfluoro-n-hexane, 1,2,2-trifluoro-trichloroethane and trifluoro-pentachloropropane; aromatic chlorinated and fluorinated hydrocarbons, such as chlorobenzene, fluorobenzene, chlorotoluene and benzo-trifluoride.

Tetrachloroethylene, trichloroethylene, 1,1,1-trichloroethane and 1,1,1-trichloropropane have proved particularly satisfactory. Mixtures of these solvents can also be used.

The continuous dyeing of synthetic fibre materials with the dyestuffs according to the invention from organic solvents is carried out by impregnating the materials with dyeing liquors which contain the dyestuffs of the Formula I, and subsequently subjecting them to a heat treatment.

To prepare the dyeing liquors, the dyestuffs according to the invention are dissolved in the organic solvents which are essentially not water-miscible, or they are added to the latter in the form of solutions in solvents which can be mixed with these solvents in any amount, such as alcohols, dimethyl formamide, dimethyl acetamide, dimethyl sulphoxide or sulpholane; the synthetic fibe materials are impregnated with the resultant clear dyestuff solutions which may contain soluble non-ionic auxiliaries for improving the levelness of the dyeings, for example, the known interface-active ethoxylation and propoxylation products of fatty alcohols, alkylphenols, fatty acid amides and fatty acids.

The heat treatment for fixation of the dyestuffs on the fibre materials may consist in a brief treatment with dry heat at 120–230° C. and this heat treatment may be preceded by an intermediate drying; or it may consist in treating the fibre materials with an overheated solvent vapor at 100–150° C. Small proportions of non-fixed dyestuff can be washed out by a brief treatment with the cold organic solvent. It should be noted that mixtures of the dyestuffs according to the invention sometimes give a higher dyestuff yield than the individual dyestuffs and that they may be even more readily soluble in the organic medium.

The synthetic fibre materials to be dyed with the dyestuffs of the Formula I according to the invention primarily comprise fiber materials of polyesters, e.g. polyethylene terephthalates, polycyclohexane-dimethylene terephthalate or polycarbonates; of 2,2-bis-(p-hydroxyphenyl)-propane; of cellulose triacetate, cellulose 2½-acetate; polyacrylonitrile; synthetic polyamides, such as polyhexamethylene-diamine adipate, poly-ε-caprolactam or poly-ω-aminoundecanic acid; and polyurethanes. The fiber materials may be present in various stages of processing, for example, as filaments, loose material, combed material, yarn; as piece goods such as fabrics or knitted fabrics, or as ready-to-wear goods.

The parts given in the following examples are parts by weight.

EXAMPLE 1

35.2 parts 3'-hydroxy-quinophthalone-5-carboxylic acid chloride are suspended in 100 parts o-dichlorobenzene, the suspension is heated to 90° C. and mixed, while stirring, with 14 parts ethyl-cyclohexylamine and then with 8.1 parts pyridine. The mixture is heated at boiling temperature under reflux for 2 hours, cooled to room temperature, and the precipitated dyestuff is filtered off with suction. The filter residue is brought to the boil in 200 parts of water, again filtered off with suction and dried. 40 parts of a yellow dyestuff of the formula

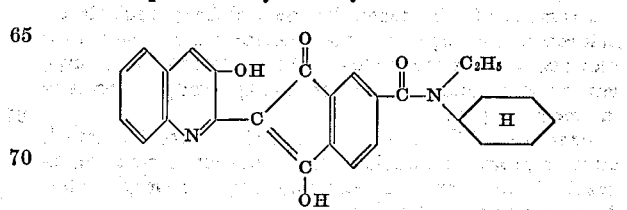

are obtained.

Analogous yellow dyestuffs of the same quality were likewise obtained in good yields when, instead of 14 parts ethylcyclohexylamine, the following amines were reacted in the same way in the stated amounts:

15.5 parts propyl-cyclohexylamine,
15.5 parts iso-propyl-cyclohexylamine,
17 parts n-butyl-cyclohexylamine,
17 parts sec.-butyl-cyclohexylamine,
26.5 parts 8-cyclohexylamino-2,6-dimethyl-octane,
37 parts stearyl-cyclohexylamine,
15.5 parts 2-ethyl-amino-1-methyl-cyclohexane,
20 parts 4-ethylamino-1-tert.-butyl-cyclohexane,
40 parts dicyclohexylamine,
27.5 parts bis-(2-chloro-cyclohexyl)-amine,
23 parts bis-(4-methyl-cyclohexyl)-amine,
32.5 parts bis-(3-iso-butyl-cyclohexyl)-amine,
26.5 parts bis-(2-methoxycyclohexyl)-amine.

EXAMPLE 2

38.6 parts 3'-hydroxy-5'-chloro-quinophthalone-5-carboxylic acid chloride acid chloride are suspended in 150 parts pyridine, and 17 parts n-butyl-cyclohexylamine are added with stirring. The mixture is boiled under reflux for hour, cooled to room temperature, and the precipitated dyestuff is filtered off with suction. The filtered residue is washed with warm water and dried. 45.5 parts of a yellow dyestuff of the formula

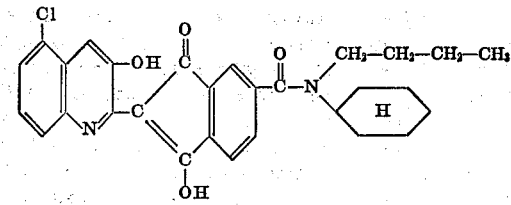

are obtained.

Analogous yellow dyestuffs of the same quality were also obtained in good yields by reacting, instead of 17 parts n-butyl-cyclohexylamine, the stated amounts of the following amines in the same way:

14 parts ethyl-cyclohexylamine,
15.5 parts propyl-cyclohexylamine,
15.5 parts iso-propylcyclohexylamine,
17 parts sec.-butyl-cyclohexylamine,
26.5 parts 8-cyclohexylamino-2,6-dimethyl-octane,
37 parts stearyl-cyclohexylamine,
15.5 parts 2-methylamino-1-methyl-cyclohexane,
20 parts 3-ethylamino-1-tert.-butyl-cyclohexane,
20 parts dicyclohexylamine,
27.5 parts bis-(3-chloro-cyclohexyl)-amine,
23 parts bis-(2-methyl-cyclohexyl)-amine,
32.5 parts bis-(4-isobutyl-cyclohexyl)-amine,
26.5 parts bis-(3-methoxy-cyclohexyl)-amine.

EXAMPLE 3

38.2 parts 3'-hydroxy-6'-methoxy-quinophthalone-5-carboxylic acid chloride are suspended in 200 parts 1,2,4-trichlorobenzene; 26.5 parts 8-cyclohexylamino-2,6-dimethyloctane and 12.5 parts dimethyl-aniline are simultaneously added at 90° C. while stirring. The mixture is then heated at 180° C. for 1 hour, cooled to room temperature, the crystallized dimethylaniline hydrochloride is filtered off with suction, and the solvent is subsequently distilled off from the filtrate in a water jet vacuum. The brown oily residue after distillation consists of the dyestuff of the formula

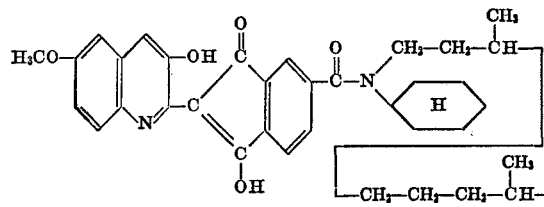

Analogous yellow dyestuffs of the same quality were also obtained by reacting, instead of 26.5 parts of 8-cyclohexylamino-2,6-dimethyloctane, the following amines in the stated amounts with 3'-hydroxy-6'-methoxy-quinophthalone-5-carboxylic acid chloride in the manner described above:

14 parts ethyl-cyclohexylamine,
15.5 parts propyl-cyclohexylamine,
15.5 parts iso-propylcyclohexylamine,
17 parts n-butyl-cyclohexylamine,
17 parts sec.-butyl-cyclohexylamine,
37 parts stearylcyclohexylamine,
15.5 parts 2-ethyl-amino-1-methyl-cyclohexane,
20 parts 4-ethylamino-1-tert.-butyl-cyclohexane,
20 parts dicyclohexylamine,
27.5 parts bis-(2-chloro-cyclohexyl)-amine,
23 parts bis-(4-methyl-cyclohexyl)-amine,
32.5 parts bis-(3-iso-butyl-cyclohexyl)-amine,
26.5 parts bis-(2-methoxy-cyclohexyl)-amine.

The following substituted quinophthalone carboxylic acid chlorides:

38.6 parts 3'-hydroxy-6'-chloro-quinophthalone-5-carboxylic acid chloride
43 parts 3'-hydroxy-6'-bromo-quinophthalone-5-carboxylic acid chloride
36.5 parts 3'-hydroxy-6'-quinophthalone-5-carboxylic acid chloride
40.8 parts 3'-hydroxy-6'-acetylamino-quinophthalone-5-carboxylic acid chloride
42 parts 3'-hydroxy-6',7'-dichloro-quinophthalone-5-carboxylic acid chloride
39.6 parts 3'-hydroxy-6'-nitro-quinophthalone-5-carboxylic acid chloride were also reacted under the reaction conditions described in Examples 1–3 with the secondary cyclohexylamines mentioned in Examples 1–3 to form analogous yellow dyestuffs in good yields.

EXAMPLE 4

35.2 parts 3'-hydroxy-quinophthalone-5-carboxylic acid chloride are suspended in 150 parts pyridine, and a mixture of 7 parts ethyl-cyclohexylamine and 8.5 parts iso-butyl-cyclohexylamine is added. The reaction mixture is boiled under reflux for 1 hour then cooled to room temperature. The precipitated dyestuff is separated, washed with warm water and dried. A dyestuff mixture consisting of about equal parts of the two following components:

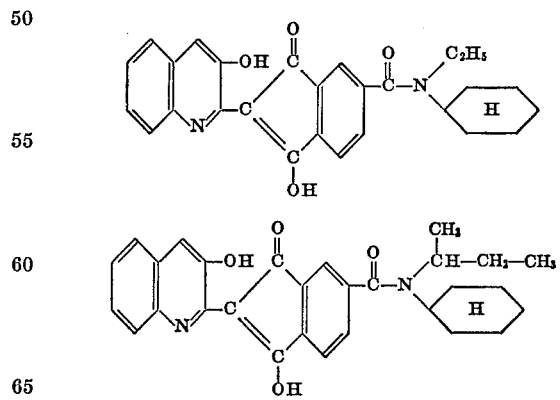

is obtained in good yield.

When used for dyeing from organic solvents as well as from water, the mixture of the two dyestuffs indicated above produces on polyester or polyamide fibres yellow dyeings with an appreciably higher dyestuff yield and better build-up than the pure dyestuffs used by themselves. Moreover, the mixture of the two dyestuffs has a substantially higher solubility at room temperature in organic solvents which are essentially immiscible with water, e.g. in tetrachloroethylene, than have the pure individual dyestuffs.

EXAMPLE 5

A fabric of polyethylene terephthalate fibers is impregnated at room temperature with a clear yellow solution containing:

10 parts 3'-hydroxy-quinophthalone-5-carboxylic acid-N-ethyl-N-cyclohexylamide (Example 1) in 990 parts tetrachloroethylene.

After squeezing to a weight increase of 60%, the fabric is dried at 80° C. for 1 minute. The small proportion of non-fixed dyestuff is subsequently washed out by a brief treatment in cold tetrachloroethylene. After drying, there is obtained a clear yellow dyeing which is characterized by the high dyestuff yield, very good build-up and outstanding fastness properties, especially very good fastness to thermofixing, washing, rubbing and light.

Equivalent clear yellow dyeings were obtained in an analogous way on fabrics of (a) cellulose triacetate
(b) synthetic polyamides or polyurethanes and
(c) polypropylene fibers, but thermosolization was carried out for (a) at 200–220° C.
(b) at 170–200° C.
(c) at 120–150° C.

Dyeing of the same quality were also obtained when the 990 parts tetrachloroethylene were replaced with the same amount of one of the following solvents: chloroform, carbon tetrachloride, dichloroethane, trichloroethane, trichloroethylene, tetrachloroethane, dichloropropane, 1,1,1-trichloropropane, chlorobutane, dichlorobutane, perfluoro-n-hexane, 1,2,2-trifluoro - trichloroethane and trifluoro-pentachloropropane.

EXAMPLE 6

25 parts of the dyestuff mixture obtained according to Example 4 are ground with 75 parts of a condensation product of β-naphthalene-sulphonic acid and formaldehyde and with 120 parts of water in a ball mill for 24 hours. The paste is subsequently dried in a vacuum at 50° C. and the residue is finely ground.

1 part of this dyestuff powder is stirred into 2000 parts of hot water which contains 8 parts of the carrier o-phenylphenol and has been adjusted with sulphuric acid to pH value of about 4.5. A very fine dyestuff suspension is obtained into which 50 parts of a fabric of polyester fibres are introduced to 40–60° C. The dyebath is heated to boiling temperature within 20 minutes and this temperature is maintained for about 1½ hours. The dyed material is then thoroughly rinsed with water and dried. A yellow dyeing of very good fastness to wet processing, sublimation and light is obtained.

We claim:

1. 3'-hydroxyquinophthalone dyestuff free from sulfonic acid groups, adjacent nitro groups and adjacent tert.-butyl groups having the formula

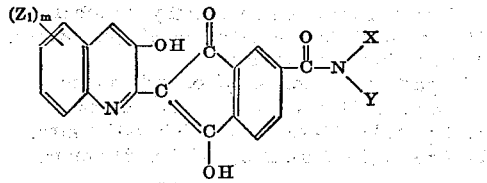

in which X is cyclohexyl or cyclohexyl mono-substituted with halogen, lower alkyl or lower alkoxy; and Y is $C_1$–$C_{17}$-alkyl; cyclohexyl; or cyclohexyl mono-substituted with halogen, lower alkyl or lower alkoxy;

$Z_1$ is halogen; nitro; $C_1$–$C_4$-alkyl; $C_1$–$C_4$-alkoxy; acetylamino; propionylamino; butyrylamino; or benzoylamino; and $m$ is an integer from 0 to 3.

2. The dyestuff of claim 1 in which X is cyclohexyl; Y is $C_1$–$C_{17}$-alkyl or cyclohexyl; and $m$ is 0.

3. The dyestuff of claim 1 in which $Z_1$ is chloro, bromo, nitro, methyl, methoxy or acetylamino.

4. The dyestuff of claim 1 having the formula

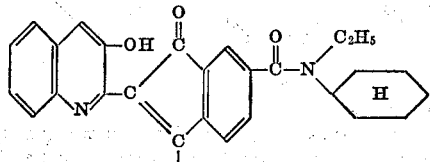

References Cited

UNITED STATES PATENTS

| | | | |
|---|---|---|---|
| 3,023,212 | 2/1962 | Richter | 260—286 |
| 3,023,213 | 2/1962 | Richter | 260—287 |
| 3,374,238 | 3/1968 | Wick | 260—287 R |

DONALD G. DAUS, Primary Examiner

U.S. Cl. X.R.

8—542, 162, 177, 178, 179; 260—287 R, 563 C